(12) United States Patent
Meyer

(10) Patent No.: US 6,745,742 B2
(45) Date of Patent: Jun. 8, 2004

(54) CONNECTING ROD STRUCTURE

(76) Inventor: Siegfried Meyer, Furschwelle 23, 86756 Reimlimgen (DE)

( * ) Notice: Subject to any disclaimer, the term of this patent is extended or adjusted under 35 U.S.C. 154(b) by 0 days.

(21) Appl. No.: 10/265,230

(22) Filed: Oct. 7, 2002

(65) Prior Publication Data

US 2004/0065292 A1 Apr. 8, 2004

(51) Int. Cl.$^7$ .............................. F02B 75/32
(52) U.S. Cl. ........................ 123/197.3; 92/153
(58) Field of Search ............ 123/197.3, 197.4; 92/153

(56) References Cited

U.S. PATENT DOCUMENTS

| | | | | |
|---|---|---|---|---|
| 3,739,657 A | * | 6/1973 | Patchen et al. | 74/587 |
| 3,785,459 A | * | 1/1974 | Patchen | 184/6.5 |
| 3,842,938 A | * | 10/1974 | Barnes-Moss | 184/6.5 |
| 4,567,815 A | * | 2/1986 | Kocher | 92/261 |
| 6,568,357 B1 | * | 5/2003 | Rao et al. | 123/48 B |

* cited by examiner

Primary Examiner—Andrew M. Dolinar
Assistant Examiner—Katrina Harris
(74) Attorney, Agent, or Firm—Rosenberg, Klein & Lee

(57) ABSTRACT

An engine having a connecting rod, a piston and a crankshaft is provided. The connecting rod extends between to connect the piston and the crankshaft. The connecting rod has formed therethrough at least one hole which provides a lubrication path to an interface between the connecting rod and piston conjunction point.

8 Claims, 2 Drawing Sheets

CONNECTING ROD STRUCTURE

BACKGROUND OF THE INVENTION

1. Field of Invention

The present invention relates to a lubrication system of engine, more particularity, and to a connecting rod structure which has at least one hole to provide lubricating effect between connecting rod and piston.

2. Description of Prior Art

Generally speaking, most of engine includes a connecting rod, a crankshaft and a piston and provide power to a machine such as car. The state of engine directly effects life of machine and performance so that a way to maintain is mainly lubricant. The lubricant mostly functions describes as following:

A. Decreasing of Friction

The metal surface is perfect smooth, but could create abrasion condition working in long term. The lubricant oil provides each parts of engine to lubricate for decreasing of friction between surfaces of metals.

B. Decreasing of Engine Temperature

The temperature of engine inside is high at 500 to 600°. In this situation, the metal not only expands to create traction but also creates carbon blacks to make higher friction heat in combustion. Therefore, using lubricant oil is best way to cool the engine.

C. Seal Function

The power of engine results from the burning high pressure gas in cylinder, and the lubricant oil makes seal on wall of cylinder in order to make the detonation power 100 percents used.

D. Clean Function

The inside of cylinder usually creates some carbon blacks or others materials in the combustion process, and the lubricant oil could bring these materials out of cylinder to maintain cylinder inside clean by circumfluence.

Generally, the lubrication system describes as following:

A. Splash Oiling System

In the splash oiling system, oil is whipped up by the crankshaft and connecting rods rotating around and dipping into the oil troughs. Oil is splashed everywhere inside the engine, and trickles down into oil collection holes and thus lubricates the bearing surfaces. Sounds precarious, but was standard automotive practice on the majority of motor vehicles of the times. It worked— probably as long as there is no prolonged high speed running . . . Roads were mostly rough dirt tracks in those days, so high speeds were rarely even contemplated.

B. Partial Pressure Oiling System

The mostly oil is provided by oil pump.

C. Splash-pressure Mixed Oiling System

The lower parts of engine used the splash oiling lubrication and the other uses the pressure oiling lubrication.

D. Pressure Oiling System

All parts of engine are lubricated by oil pump.

The conventional lubrication system has some disadvantages such as the short of lubrication between the connecting rod and piston after the engine did not work at long time, the engine could be damage. Further more, the oil pump needs more power to work so that each parts of engine could lubricate leading to spend more gasoline.

SUMMARY OF INVENTION

It is an object of the present invention is to provide at least one hole of connecting rod structure which makes effective lubrication between the connecting rod and piston.

It is another object of the present invention to provide a connecting rod structure which to save energy of oil pump and gasoline.

The present invention discloses a saving power and simple structure in a car engine. The engine includes a piston, a connecting rod and a crankshaft, and the connecting rod connects the piston and the crankshaft. The conventional lubrication system is provided an oil pump to lubricate each composition in engine. The piston and pin is lubricated by an oil path of connecting rod. The present invention provides at least hole to lubricate between the piston and connecting rod as well as piston pin. The oil is directly provided by the oil pump, and the connecting rod structure does not construct any oil path to provide lubrication.

BRIEF DESCRIPTION OF DRAWINGS

The above and further objects, features and advantages of the invention will become clear from the following more detailed description when read with reference to the accompanying drawings in which.

DETAIL DESCRIPTION OF THE PREFERRED EMBODIMENTS

Figure 1:
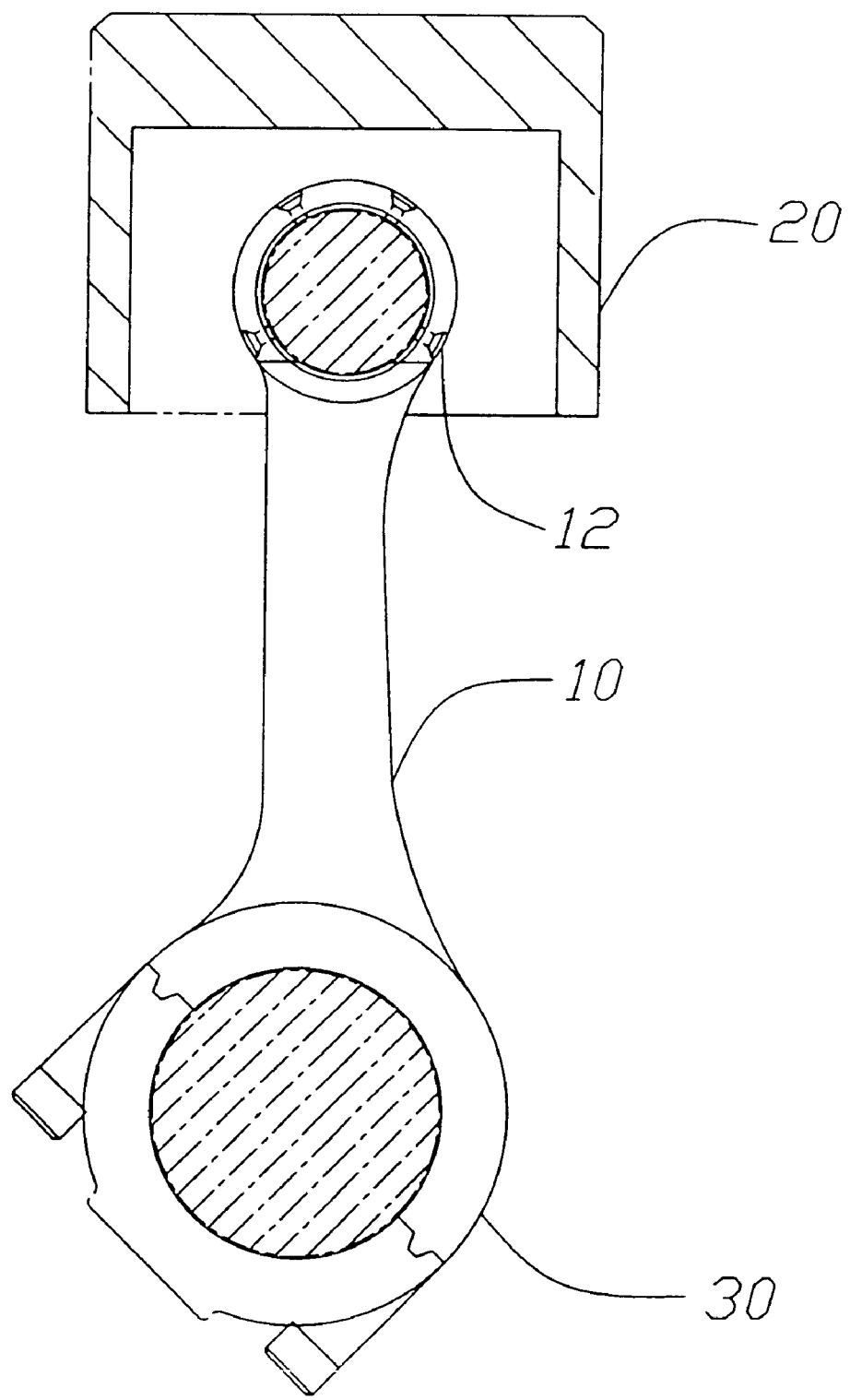
FIG. 1 is a illustrated view of the present invention.

Referring to FIG. 1, the present invention discloses a connecting rod 10 which connects a piston 20 and a crankshaft 30. The connecting rod 10 comprises at least one hole 12 which provides lubrication system to engine. Furthermore, one end of the connecting rod 10 couples to the piston 20 has at least one hole 12 to lubricate. The connecting rod 10 does not design any oil path for lubricating between the connecting rod 10 and the piston 20. According to design of the present invention, the structure of the connecting rod 10 of the present invention provides an effective lubrication system to lubricate between the piston 20 and connecting rod 10.

Referring to FIGS. 2A to 2D, the connecting rod of present invention provides the lubrication system in engine operation. In this embodiment discloses four holes of lubrication system between the connecting rod and piston. Referring to FIGS. 2A to 2D, the holes provide oil to lubricate between piston and connecting rod. When the engine begins to operate, the piston and connecting rod always are short of oil to lubricate. Therefore, the engine is often broken down as lack of lubrication system. The present invention enables faster operation of engine.

Figure 2D:
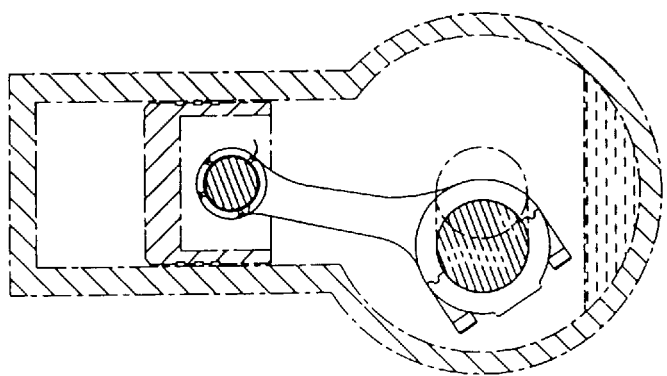
FIGS. 2A to 2D are illustrated views of the oil lubricating ways of the resent invention.
Figure 2C:
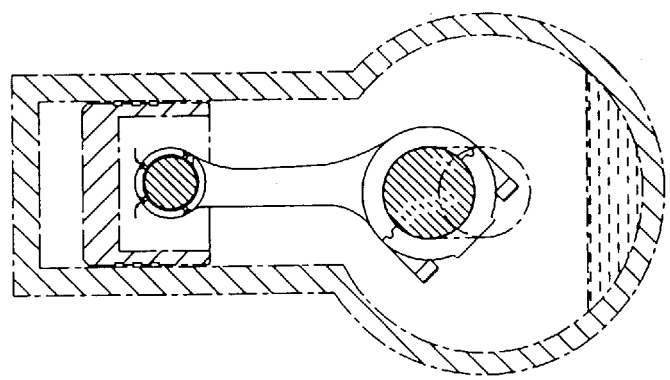
Figure 2B:
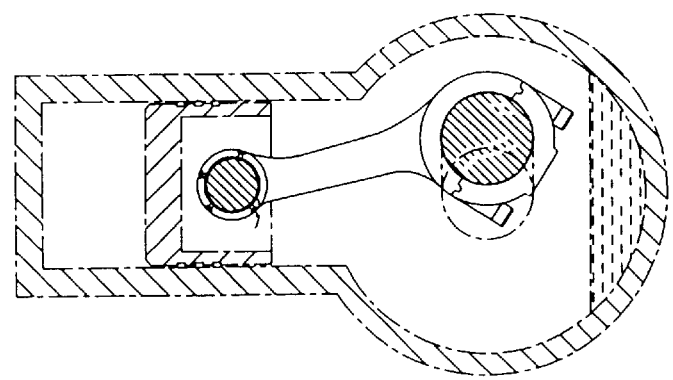
Figure 2A:
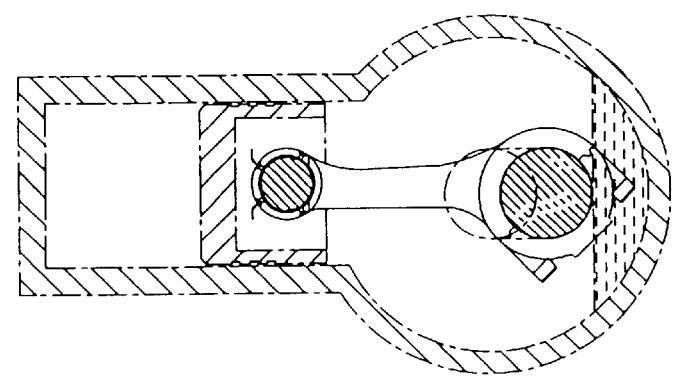

When the piston moved down, the oil is provided by upper holes as FIG. 2A. And, as FIG. 2B, the piston moved right, the oil is provided by left lower hole. Further, the piston moved up, the oil is provided by upper holes, as FIG. 2C. According to FIG. 2D, when the oil moved left, the oil is provided by right lower hole.

The present invention discloses a lubrication system between the connecting rod and piston. The oil lubrication has a cool function to provide between the connecting rod and piston when the engine is running. Owing to the oil directly provides between the connecting rod and piston, the equipment saves power of oil pump power. The conventional oil pump needed more power so that the connecting rod and piston have sufficient oil lubrication to lubricate. And, the oil pump does not need more power, the equipment can save fuel. Further, the lubrication system of the present invention is directly provided oil lubrication by oil pump so that the lubrication is effective more than conventional lubrication by the lubrication path of connecting rod.

The present invention comprises at least one hole of connecting rod to provide lubrication between the connecting rod and piston. The hole of connecting rod sets on one end thereof connecting to piston. The advantages of the present invention are effective lubrication, saving fuel and perfect operation of engine.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An engine comprising:

a connecting rod, a piston and a crankshaft, the connecting rod connecting between the piston and the crankshaft, the connecting rod having at least one hole formed therethrough, the hole communicating with a space in the piston outside the connecting rod for providing a lubrication path from the outside space to an interface of the connecting rod and piston conjunction point.

2. The engine as claimed in claim 1, wherein the connecting rod is provided lubrication effect by a lubrication system.

3. The engine as claimed in claim 2, wherein the lubrication system is an oil pump.

4. An engine comprising:

a connecting rod, a piston and a crankshaft, the connecting rod connecting between the piston and the crankshaft, the connecting rod having at least four holes which provide a lubrication path from a space in the piston to the connecting rod and piston conjunction point.

5. An engine comprising:

a connecting rod, a piston and a crankshaft, the connecting rod extending between the piston and the crankshaft, one end of the connecting rod having a first coupling device which couples to the crankshaft, and the other end of the connecting rod having a second coupling device which couples to the piston, wherein the second coupling device has at least one hole formed therethrough, the hole communicating with a space in the piston outside the connecting rod for providing a path for the oil from the outside space to an interface of the connecting rod and piston.

6. The engine as claimed in claim 5, wherein the connecting rod is provided lubrication effect by a lubrication system.

7. The engine as claimed in claim 6 wherein the lubrication system is an oil pump.

8. An engine comprising:

a connecting rod, a piston and a crankshaft, the connecting rod connecting between the piston and the crankshaft, one end of the connecting rod having a first coupling device which couples to the crankshaft, and the other end of the connecting rod having a second coupling device which couples to the piston, the second coupling device of the connecting rod having at least four holes which provide a path to fill the oil between the connecting rod and piston, the holes being equally spaced at four parts of the second coupling device.

* * * * *